Aug. 11, 1959           Z. V. WEISEL           2,898,745
AUTOMOBILE AIR CONDITIONING AND SUPERCHARGING SYSTEM
Filed April 19, 1954           2 Sheets-Sheet 1
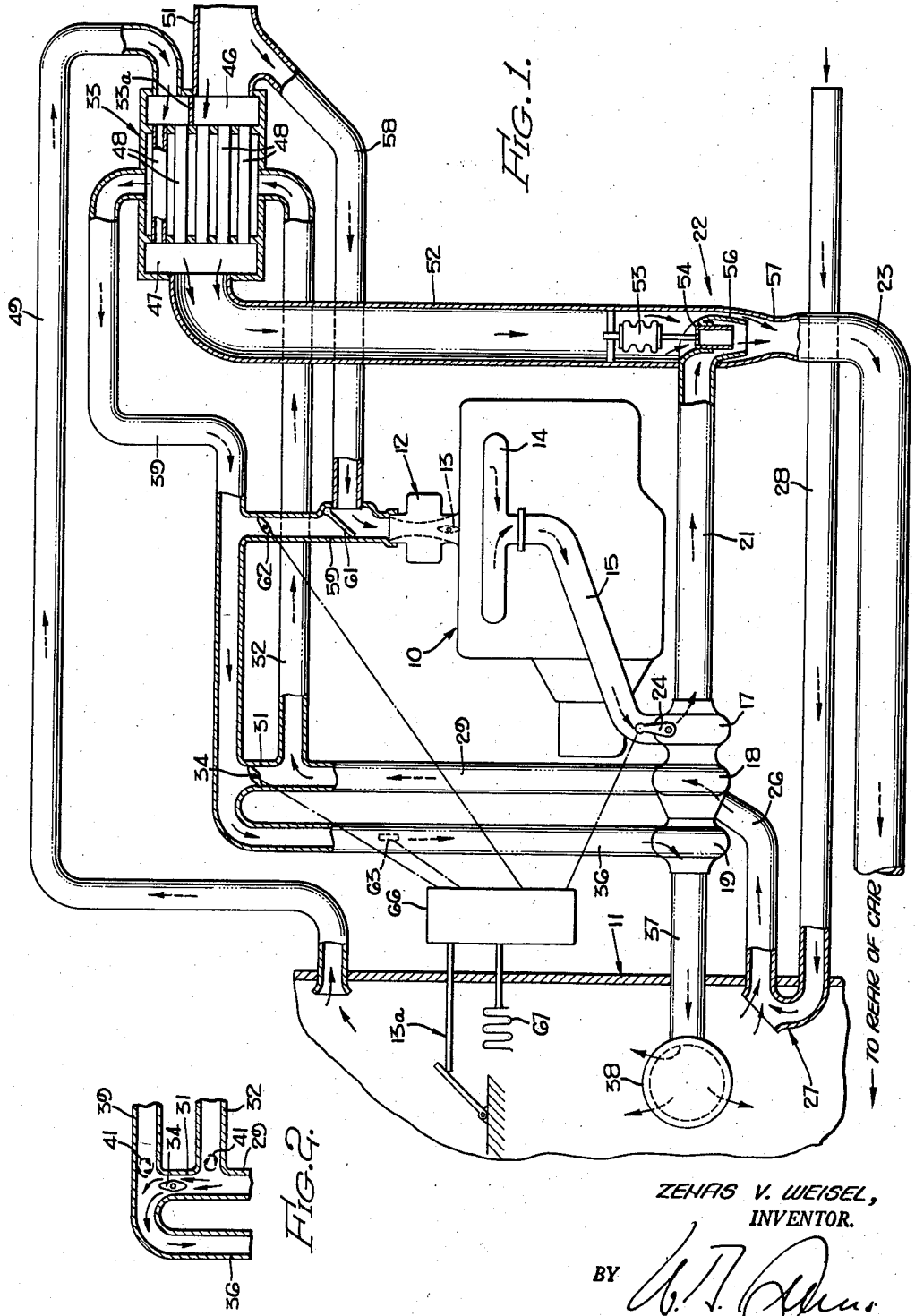
ZEHAS V. WEISEL,
INVENTOR.

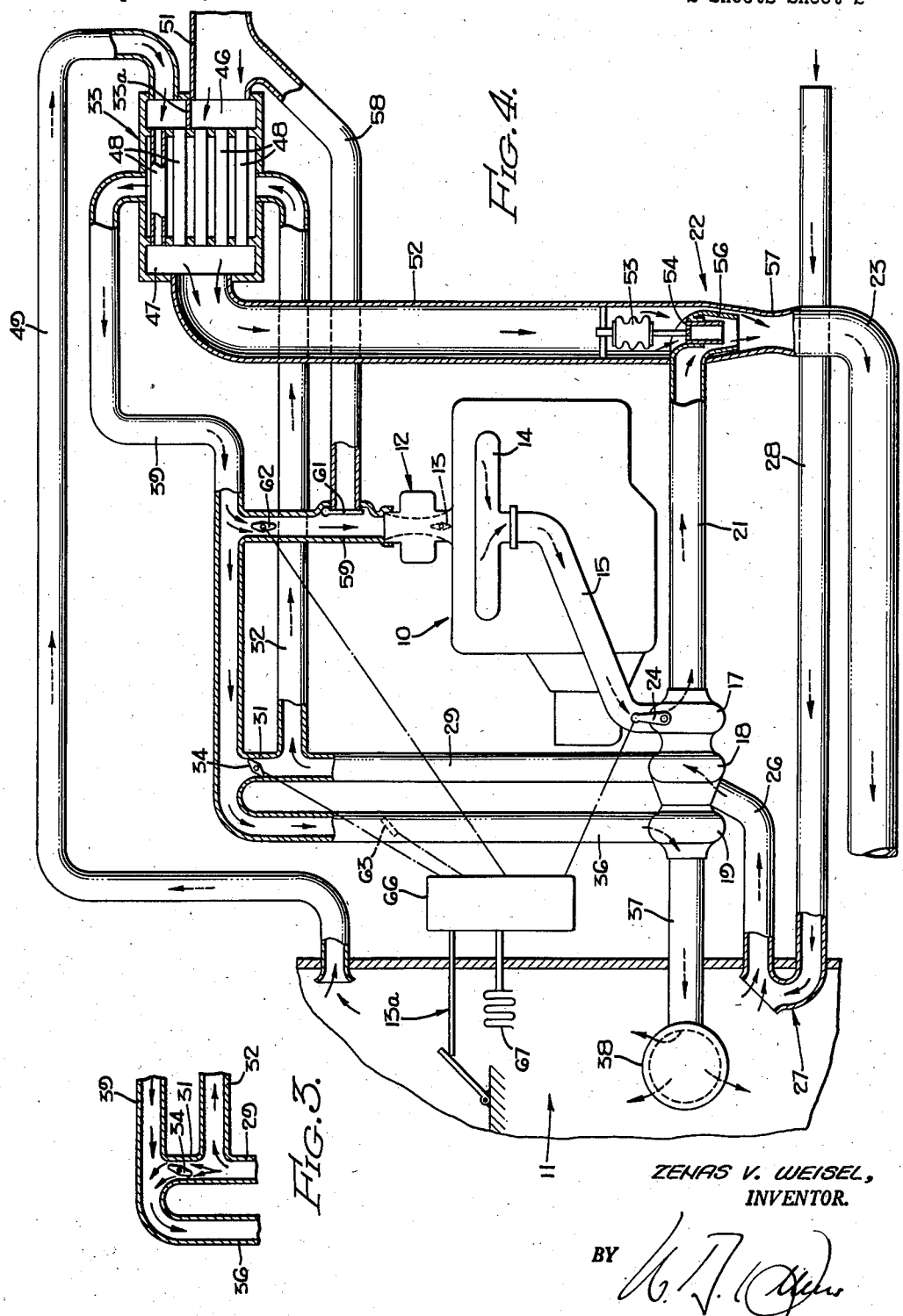

United States Patent Office 2,898,745
Patented Aug. 11, 1959

2,898,745

AUTOMOBILE AIR CONDITIONING AND SUPERCHARGING SYSTEM

Zenas V. Weisel, Los Angeles, Calif.

Application April 19, 1954, Serial No. 423,936

6 Claims. (Cl. 62—172)

This invention relates to an air conditioning system, and particularly to an air conditioning and supercharging system for vehicles, such as automobiles, powered by internal combustion engines.

The relatively recent rush to provide an air conditioning system which will effect not only heating but also cooling of an automobile has resulted in the provision of a wide variety of equipment embodying numerous principles of operation. One such type of equipment utilizes a battery powered electric motor, or the automobile crank or drive shaft, to power a conventional compressor forming part of a refrigeration system much like that in a household refrigerator. Such equipment, however, is generally so bulky that it must be located in the trunk or rear of the vehicle, and is otherwise relatively unsatisfactory in that it requires a large amount of shaft horsepower or electrical power. Furthermore, such equipment does not generally embody means for heating the car, this being accomplished by heaters the same as are employed in automobiles not air cooled.

A more compact and efficient system than one employing equipment of the type indicated above, and which does not require batteries and does not subtract substantially from the useful power delivered to the wheels of the vehicle, makes use of engine exhaust gases to drive an exhaust gas turbine which then drives the compressor. Such systems have heretofore been employed on aircraft, and in a manner selectively effecting both cooling and heating of the airplane cabin. However, in order to make the change from heating to cooling the aircraft systems resort to passing selectively cool outside air and engine exhaust gases through a heat exchanger. This is highly undesirable since any leak or imperfection in the heat exchanger may result in the mixture of carbon-monoxide gas with air flowing to the passenger compartment. A disadvantage in applying the above type of air conditioning system to automobiles results from the fact that an airplane is generally traveling at a relatively high rate of speed and seldom lacks for a high flow of cooling air from the ambient atmosphere. An automobile, on the other hand, requires air cooling the most when it is traveling at a low rate of speed, such as in a hot city, there then being little or no flow of cooling air from the atmosphere.

In view of the above factors characteristic of the field of vehicle air conditioning systems, and particularly the air conditioning systems employed in automobiles, it is an object of the present invention to provide a system utilizing the exhaust gases of an internal combustion engine for both heating and cooling functions, but one which does not pass the exhaust gases through a heat exchanger for the purpose of transferring heat to air flowing to the passenger compartment of the vehicle.

A further object is to provide an automobile air cooling system which operates with substantially the same high efficiency and effectiveness at both low and high automobile speeds.

Another object of the invention is to provide an efficient, economical and compact air conditioning system which may be disposed, in its entirety, under the hood of a conventional automobile.

Another object is to provide a system operable to effect supercharging of the air passing to the internal combustion engine of the vehicle, and to effect selective heating, ventilating and cooling of the vehicle passenger compartment.

An additional object of the invention is to provide means associated with the exhaust gas turbine of the air conditioning system to draw cooling air through a heat exchanger and in volumes depending upon a characteristic of the cooling air.

Another object is to provide a combination air conditioning and supercharging system adapted to provide cooled compressed air to the carburetor of the automobile engine, so that a greater mass of air is supplied to the engine, at a given supercharging pressure, than would be the case if warm air were employed.

Another object is to provide an automobile air conditioning system which operates substantially instantaneously upon starting of the automobile engine.

These and other objects and advantages of the invention will be more fully set forth in the following specification and claims considered in connection with the attached drawings to which they relate.

In the drawings:

Figure 1 is a schematic representation of an automobile air conditioning and supercharging system embodying the present invention, the control valves in the system being shown as adjusted to effect a cooling function;

Figure 2 is a fragmentary schematic view illustrating the change which must be made in the control setup of Figure 1 in order to provide heating instead of cooling of the air delivered to the passenger compartment of the vehicle;

Figure 3 corresponds to Figure 2 but illustrates the change made to effect mere ventilation of the passenger compartment, as distinguished from ventilation plus either heating or cooling thereof; and Figure 4 is a full schematic representation corresponding to Figure 1, but showing the controls as set up for supercharging of the internal combustion engine, and for partial cooling of the passenger compartment.

Referring to the drawings, the air conditioning and supercharging system is illustrated schematically as embodied in a vehicle, such as an automobile, which is powered by an internal combustion engine 10 and has a passenger compartment or cabin shown fragmentarily at 11. Engine 10 is shown as being of the conventional type having a carburetor 12 with a foot-operated throttle valve 13 therein, and also having an exhaust manifold 14 to direct exhaust gases from the cylinders of the engine to an exhaust pipe or conduit 15.

According to the invention, a rotary unit consisting of an exhaust gas turbine 17, a rotary or centrifugal air compressor 18, and an expansion or cooling turbine 19 is suitably mounted, together with substantially all of the components of the system later to be described, under the hood of the vehicle. The intake of exhaust gas turbine 17 is connected to the pipe 15 leading to exhaust manifold 14, while the exhaust of the turbine is connected through a conduit 21 to a variable area ejector jet 22 to be described in detail subsequently. From jet 22, the exhaust gas passes into a conduit 23, leading to the rear of the vehicle, and discharges to the atmosphere.

A suitable valve arrangement, indicated schematically at 24, is provided for the purpose of increasing or decreasing the pressure differential across exhaust gas turbine 17 and thus varying the turbine speed, there being an increase in speed with an increase in pressure drop. Preferably, turbine 17 embodies a scroll the cross-sectional area of which may be varied through operation of valve arrangement 24, so that the scroll area may be reduced, for example, to increase the pressure differential across the turbine and thus increase its speed as may be desired. With such an arrangement the speed of exhaust gas turbine 17, and thus of compressor 18 and cooling turbine 19, may be relatively high although the speed of internal combustion engine 10 is low, this being important to the attaining of efficient cooling when the automobile is traveling slowly.

For a more detailed description of exhaust gas turbine 17, compressor 18 and expansion turbine 19, all of which are preferably in a common housing and have their rotors mounted on a common shaft, reference is made to my co-pending application Serial No. 592,105, filed June 18, 1956, for Turbo-Compressor Apparatus.

Rotary air compressor 18 is connected at its intake to a pipe or conduit 26 leading to a suitable air mixing device 27 in the passenger compartment 11. Mixing device 27, in turn, is connected to an intake pipe 28 leading to the forward part of the automobile and adapted to receive air from the ambient atmosphere as the automobile moves forwardly. The arrangement is thus one in which outside air is delivered to the mixing device 27 and may, in some instances such as when the air conditioning system is not in operation, pass directly to the passenger compartment 11. However, in most cases the incoming air flowing through conduit 28 is sucked, together with some air from passenger compartment 11, into conduit 26 leading to compressor 18. The air is then compressed, and is heated as an incident of compression, after which it is delivered through the exhaust of the compressor to a conduit 29 connected both to a bypass line 31 and to a line 32 leading to a heat exchanger 33. The bypass line 31 is provided with a butterfly valve 34, which when fully open as illustrated in Figure 2, permits heated compressed air from compressor 18 to pass directly into a line 36 leading to the intake of expansion turbine 19, the latter being connected at its exhaust to a pipe 37 leading to an air distributor 38 in passenger compartment 11. When, on the other hand, butterfly valve 34 is fully closed as shown in Figure 1, all of the heated compressed air from compressor 18 is diverted through line 32 to heat exchanger 33. It is then cooled, as will be described, and discharges to a line 39 connected directly to the line 36 leading to expansion turbine 19.

It is to be noted that line 32, bypass line 31, and the adjacent portion of line 39 are shaped generally as a U. Furthermore, the line 29 and bypass 31 are aligned with each other and may be regarded as the stem of a T the cross arm of which comprises the aligned and adjoining portions of lines 36 and 39, the line 32 projecting perpendicularly from the T stem. This arrangement is important since it results when the butterfly valve 34 is in the fully open position illustrated in Figure 2, in formation of eddy currents in lines 32 and 39 and indicated at 41. These eddy currents have the effect of preventing the flow of air through line 32, heat exchanger 33 and line 39. It follows that substantially all of the compressed air flows from line 29 to line 36 when valve 34 is fully open, there is no necessity for provision of an additional valve such as in line 32 or 39. When, however, the butterfly valve 34 is only partially open as shown in Figure 3, compressed air flows not only through bypass 31 to line 36, but also through lines 32 and 39 and heat exchanger 33.

The heat exchanger 33 may be of any suitable type, and is shown as comprising inlet and outlet headers 46 and 47 having a large number of thin-walled pipes 48 extended therebetween. In the illustrated embodiment, the heat exchanger construction is such that the cooling medium or coolant flows through the headers and through pipes 48, while the compressed air from line 32 passes over the exterior pipe surfaces and is thus cooled prior to entering line 39. The cooling medium in heat exchanger 33 is preferably air, the inlet header 46 being connected both to a pipe or line 49 leading to the passenger compartment 11, and to a pipe 51 leading to an air scoop adapted to receive fast flowing air from the ambient atmosphere. These connections are separate, however, a baffle 33a being provided to cause air from conduit 49 to flow through those of pipes 48 over which the compressed air passes just prior to entering conduit 39. After flowing through headers 46 and 47 and pipes 48, the coolant air both from passenger compartment 11 and from the ambient atmosphere passes into a conduit 52 leading to the ejector jet 22. Conduit 52 forms an axial extension of conduit 23 through which the exhaust gases from turbine 17 pass.

The ejector jet 22 constitutes a means for varying the rate of coolant air flow through heat exchanger 33 in accordance with a characteristic of the coolant, preferably its temperature when discharged from the heat exchanger. The ejector jet 22 comprises a temperature responsive bellows 53 suitably mounted within conduit 52 and operatively connected to a short cylinder or tube 54 which is disposed within a bent over or angled nozzle end portion 56 of pipe 21. The nozzle portion 56 is somewhat conical in shape and is of lesser diameter than the surrounding conduit 52, it being noted that the juncture of conduits 52 and 23 constitutes a slight neck 57 adjacent the nozzle end. The arrangement is one in which some of the cooling air which flows through conduit 52 passes through cylinder 54, while some passes over the exterior nozzle end surfaces.

The shape of the walls of nozzle 56 is such that movement of cylinder 54 due to the expansion or contraction of bellows 53 varies the gap or opening between the free cylinder end and the end of the nozzle. Thus, when the bellows 53 is contracted and the cylinder is in an elevated position, as viewed in Figures 1 and 4, there is a relatively large gap or passage for the flow of exhaust from line 21, and the jet or ejector action is relatively little. When, however, the bellows expands to effect lowering of cylinder 54, the gap between the free cylinder end and the nozzle end lessens to increase the velocity of the exhaust gas and thus increase the jet or ejector action, the jet being, of course, directed into pipe 23 for discharge at the rear of the car. It follows that when the temperature in line 52 is high and the bellows 53 expanded, the jet action is such as to draw an increased volume of air through conduit 52 and thus through the heat exchanger, the converse occurring when the temperature of conduit 52 is low and the jet action reduced.

Proceeding next to a description of the supercharging portion of the system, it will be noted that the normal flow of intake air to carburetor 12 of internal combustion engine 10 is through a bleed line 58 connected at one end to pipe 51. At its other end, line 58 is connected to a conduit or pipe 59 extending between the intake of carburetor 12 and the line 39. A flap or check valve 61 is provided at the junction of lines 58 and 59, and a butterfly-type control valve 62 is provided in line 59 between line 58 and line 39. When the control valve 62 is fully closed as shown in Figure 1, the flow of air to carburetor 12 is solely through the bleed line 58, the check valve 61 then being open as illustrated. When, however, the valve 62 is open as shown in Figure 4, compressed air from line 39 passes downwardly through line 59 and into carburetor 12, the check valve 61 then being closed to prevent escape of air through the bleed 58. The change from normal carburetor operation to supercharged operation is not only effected by valve 62, but also by a butterfly valve 63 in line 36, it being noted that when valve 63 is fully closed all the compressed air from compressor 18 is utilized for supercharging. When, however, the valve 63 is fully open or only partially open as shown in Figure 4, some of the compressed air from compressor 18 is utilized for supercharging while the remainder is passed through expansion turbine 19 and to passenger compartment 11. It is preferred, however, that valve 63 never be fully closed, since overheating of turbine 19 might otherwise result.

Referring specifically to Figure 1 of the drawings, the operation of the air conditioning and supercharging system in effecting cooling of the passenger compartment 11 will next be described. When set for maximum cooling action, the bypass valve 34 is fully closed, valve 62 in supercharging line 59 is also fully closed, and valve 63 in line 36 is fully open. Engine 10 is then operating on atmospheric air delivered from intake line 51 and through bleed line 58 to carburetor 12.

When the valves are in the above positions, ambient atmospheric air is delivered through line 28 to the mixing device 27, and a mixture of atmospheric air and air from pasenger compartment 11 passes through line 26 to the intake of compressor 18 powered by exhaust gas turbine 17. The air is then compressed and heated, and is discharged through line 29 to line 32 leading to heat exchanger 33, the bypass valve 34 then being fully closed as previously stated. As the compressed air from compressor 18 passes through heat exchanger 33 it is cooled substantially, after which it flows through line 39 and connecting line 36 to the expansion turbine 19. In expansion turbine 19, the pressure of the air is reduced to atmospheric and a large amount of cooling takes place, so that the air discharged through line 37 to air distributor 38 is relatively cool as is desired.

The cooling air for heat exchanger 33, and to which heat is transferred from the hot compressed air discharged from compressor 18, comes from passenger compartment 11 by means of pipe 49, and from the ambient atmosphere by means of line 51 leading to an air scoop, not shown. When the automobile is traveling at a high rate of speed, the air in intake line 51 moves rapidly and there is a large volume of air conducted through the cooling pipes 48 over which the hot compressed air passes. Accordingly, the cooling air is not heated to a large extent and the temperature in the exhaust line 52 from heat exchanger 33 is relatively low. It follows that the bellows 53 will then be in a contracted condition and that short cylinder 54 will be elevated, as viewed in Figures 1 and 4, to increase the area of the opening through which exhaust gases from turbine 17 and line 21 discharge into pipe 23. This increase in the opening through which exhaust gases may discharge is desirable since a substantial jet action is not needed when the car is traveling at a high speed, and since it is desirable to reduce the back pressure against turbine 17 and engine 10 in order to prevent the latter from performing unnecessary work with resultant decrease in efficiency.

The above high speed situation is to be contrasted with the situation occurring when the car is traveling slowly, so that the intake of air through line 51 is at a low velocity. Under such circumstances the air passing through pipes 48 is heated to a larger extent and the temperature in line 52 rises considerably. The bellows 53 then expands to lower the cylinder 54 and decrease the area of the opening through which the exhaust gases may discharge. The exhaust gases then travel with increased velocity, and the jet or suction effect is increased. As the jet or suction action increases, air is drawn at an increased rate through lines 49 and 51 and through heat exchanger 33 to line 52. The resultant increase in coolant air flow through heat exchanger 33 results in a substantially increased cooling of the hot compressed air passing from line 32 to line 39, which results in additional cooling of the air delivered through expansion turbine 19 to air distributor 38. In addition, more rapid flow of exhaust air from compartment 11 through pipe 49 is effected, and stale air is sucked from the passenger compartment at an increased rate as is desirable when the car is moving slowly.

Because of the provision of ejector jet 22, the flow of coolant air through the heat exchanger and through line 52 is substantially the same when the car is traveling at sixty miles an hour as at thirty miles per hour. Cooling of the automobile when it is traveling at low speeds, such as in city driving, is thus effected in a highly simple and economical manner, and there is no unnecessary work performed by the motor 10 when the car is traveling at high speeds.

As indicated heretofore, the valve arrangement 24 associated with exhaust gas turbine 17 may be operated to increase and decrease the speed of the turbine and thus of compressor 18 and cooling turbine 19. It is emphasized, however, that even though valve 24 is set in such a way that turbine 17 is operating at a high velocity when engine 10 is operating at low speed, such as in city driving, the volume of exhaust gas passing from exhaust manifold 14 to ejector 22 is relatively low, so that there is relatively little jet action and the coolant air flow is insufficient. Thus, the valve 24 may not alone be called upon to provide the necessary cooling of the automobile when it is traveling at low speed, it being necessary that a substantial heat transfer occur in heat exchanger 33. An adequate heat transfer in the heat exchanger will not take place unless the coolant flow through the heat exchanger is maintained high due to operation of the ejector 22 or equivalent air moving means.

The cooling which takes place in heat exchanger 33 is further enhanced due to the described construction by which air from passenger compartment 11 is used as the coolant in the last pass of the heat exchanger. The air sucked through line 49 from the passenger compartment is substantially cooler, during hot weather, than the atmospheric air flowing through line 51. It follows that the last pipes 48 over which compressed air flows are the coolest, which results in a highly important final cooling action.

Referring next to Figure 2 of the drawings, and which illustrates the portions of the lines 39, 36, 29 and 32 surrounding the bypass line 31, the bypass valve 34 is shown as in the fully open position which results in heating instead of cooling of the passenger compartment 11. All of the remaining valves and connections in the system are set the same for heating as for the cooling operation described in connection with Figure 1, and it is to be understood that the circuit is the same except for the setting of valve 34. When the valve 34 is set for heating, air is drawn from the atmosphere and from the passenger compartment to compressor 18 where it is compressed and heated. The hot compressed air passing from the compressor 18 and through pipe 29 is not, however, cooled in heat exchanger 33 since it is bypassed through line 31 and directly to line 36, the eddy currents indicated at 41 being operative, as previously described, to prevent any substantial circulation of air through the heat exchanger. After passing through pipe 36, the hot compressed air is expanded and cooled somewhat in cooling turbine 19, but this action is insufficient to cool the air as much as it was heated in compressor 18. It follows that the air passing through line 37 to air distributor 38 is still relatively warm and may be employed to heat the passenger compartment 11 as is desired. It is emphasized that in the present system, in which the change from cooling to heating is effected by bypassing the heat exchanger 33, there is no necessity for passing hot exhaust gases through the heat exchanger with the resultant danger that carbon-monoxide may leak into the air stream flowing to the passenger compartment.

Referring next to Figure 3, the system is again the same except that bypass valve 34 is set to a predetermined partially open position in order to effect mere ventilation of passenger compartment 10, as distinguished from ventilation plus heating or cooling. Since valve 34 is partly open, a portion of the hot compressed air discharged from compressor 18 passes directly through bypass 31 to line 36, while another portion passes through lines 32 and 39 and heat exchanger 33 where cooling takes place. The relatively cool air flowing through line 39 thus mixes, above bypass valve 34, with the relatively hot air previously bypassed through line 31, the temperature of the resultant mixture depending upon the setting of valve 34. The mixed hot and cool air expands in expansion turbine 19 to bring the air temperature down to approximately that of the ambient atmosphere, so that air discharged through distributor 38 is used for ventilation only. It will be apparent that the turning of valve 34 to positions intermediate the positions illustrated in Figures 1, 2 and 3 will result in varying degrees of either heating or cooling of the passenger compartment.

Referring next to Figure 4, the system is shown as set for its supercharging function, bypass valve 34 now being fully closed, valve 63 partially closed, valve 62 in supercharging line 59 fully open, and flap valve 61 closed. Air sucked from the ambient atmosphere and from the passenger compartment passes into line 26 as before. It is then compressed in compressor 18 and flows through lines 29 and 32 to heat exchanger 33 where a substantial amount of heat is given off. The cool compressed air then passes through line 39 and downwardly through supercharging line 59 to carburetor 12 for supercharging of the air intake to internal combustion engine 10. The amount of air thus delivered to the engine 10 is largely dependent upon the position of valve 63, the entire output of compressor 18 being used for supercharging when valve 63 is fully closed. In the position illustrated, however, the valve 63 is only partially closed so that some of the cool compressed air from heat exchanger 33 passes through line 36 to cooling turbine 19 from which it flows to air distributor 38 for the purpose of cooling the compartment 11.

It will be evident that the various valves 24, 34, 62 and 63 may be operated manually, for example by levers or wires extending from the passenger compartment 11.

It will be further apparent that the system may be set either for cooling, heating or supercharging and left in such condition for extended periods of time, without variation from one form of operation to the other. Preferably, however, the valves are controlled automatically and in such a manner that heating, cooling and supercharging are effected at the desired times.

A control for accomplishing automatic operation is illustrated schematically at 66 and is shown as connected through linkages, indicated by dashed lines, to valves 24, 34, 62 and 63. The control 66 is associated with a temperature sensing element 67, disposed in passenger compartment 11, and is also associated with the foot throttle 13a of the automobile and which is connected by means, not shown, to throttle valve 13 previously indicated. Operation of the control 66 is such that the position of the bypass valve 34 varies with the temperature in passenger compartment 11, as sensed by the element 67, so that the passenger compartment temperature remains at a desired value such as 70 degrees Fahrenheit. The control 66 being also responsive to the foot throttle, it follows that even when the engine 10 is operating relatively fast to increase the flow of exhaust gas to turbine 17, the valve 24 and other elements may be so regulated that the heating or cooling action is not affected in such a way as to alter the desired passenger compartment temperature. The converse, of course, applies when the automobile engine 10 is running slowly and the volume of exhaust gas is small, the heating, cooling or ventilating functions then continuing unimpaired due to the operation of the control 66 on the various valves.

In the preferred embodiment it is desired that supercharging, such as is illustrated in Figure 4, only occur when the foot throttle 13a is in a predetermined depressed condition such that the automobile is operating at a relatively high speed or is accelerating rapidly. For example, the control 66 may be so set that supercharging only occurs when the throttle valve 13 is at least three-fourths open. When the throttle valve is thus approximately three-fourths open, foot throttle 13a overrides the automatic temperature control elements and effects opening of supercharger valve 62 and partial or full closing of valve 63 to result in supercharging as previously described. Stated otherwise, when the throttle valve 13 is approximately three-fourths open, in the illustrative situation, the various valves operate in a predetermined sequence such that a substantial portion of the air from heat exchanger 33 is diverted through supercharging line 59 to carburetor 12. Although cooling air is thus prevented from passing to the cooling turbine 19 and air distributor 38, the loss in cooling action is not generally great since the foot throttle is normally thus depressed for only short periods of time.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A system for temperature conditioning and ventilating a compartment in a self-propelled road vehicle having an internal combustion engine, said system comprising an exhaust gas turbine, a heat exchanger having independent passages, means to conduct exhaust gases from said engine to the inlet of said turbine, means responsive to the flow of exhaust gases from said engine to produce a flow of atmospheric cooling air through one passage of said heat exchanger, valve means to effect variation in the speed of said turbine, a rotary compressor driven by said turbine at a speed depending upon the speed of said engine and the setting of said valve means, conduit means to conduct hot compressed air from said compressor through a different passage of said heat exchanger to cool said compressed air, rotary air expansion means having a driving connection with said rotary compressor, and conduit means to conduct cooled compressed air from said heat exchanger to said rotary air expansion means for adiabatic expansion therein, and means for conducting the air so cooled to said vehicle compartment at substantially atmospheric pressure.

2. The invention claimed in claim 1 characterized in that said exhaust gas flow responsive means comprises ejector jet means positioned co-axially within an atmospheric cooling air duct connected with said heat exchanger, and means to conduct exhaust gases from the outlet of said turbine to said ejector jet means to effect aspiration of atmospheric cooling air through said heat exchanger.

3. The invention claimed in claim 2 including temperature responsive means responsive to the temperature of the atmospheric cooling air on the discharge side of said heat exchange means and including means operatively connected therewith for varying the effectiveness of said ejector jet means in circulating atmospheric cooling air through the heat exchange means.

4. A system for air conditioning a compartment in a road vehicle propelled by an internal combustion engine and energized by waste heat contained in exhaust gases discharging from said internal combustion engine, said system including an air compressor, turbine means coupled to said compressor and arranged to be driven by said engine exhaust gases, means utilizing said engine exhaust gases for circulating a cooling medium in heat exchange with said compressed air to remove heat therefrom, including thermally responsive means operable to vary the rate of the cooling medium flow in response to variations in the flow of exhaust gases from the engine being so arranged that a decrease in exhaust gas flow is effective through said thermally responsive means to increase the flow of cooling medium, expansion turbine means having a driving connection with said compressor and operable to derive energy from said cooled compressed air to aid in driving said compressor as said compressed air expands to atmospheric pressure in passing through said expansion turbine means, and means for delivering the resultant cooled air to the passenger compartment of said vehicle.

5. The combination defined in claim 4 characterized in the provision of means responsive to a slower rate of engine operation to increase the flow of cooling medium in heat exchange with said compressed air to increase the cooling of the compressed air and thereby compensating at least in part for the decreased volume of compressed air delivered by the slower speed of the compressor during slower engine operation.

6. The combination defined in claim 4 characterized in the provision of means for circulating relatively cool air from said compartment into heat exchange with said compressed air to remove heat therefrom prior to the delivery of the compressed air to said expansion turbine means.

References Cited in the file of this patent

UNITED STATES PATENTS

| | | |
|---|---|---|
| 2,409,159 | Singleton | Oct. 8, 1946 |
| 2,484,851 | Paget | Oct. 18, 1949 |
| 2,491,461 | Wood | Dec. 13, 1949 |
| 2,582,848 | Price | Jan. 15, 1952 |
| 2,628,482 | Burgess | Feb. 17, 1953 |
| 2,670,613 | Haltenberger | Mar. 2, 1954 |
| 2,678,542 | Stanton | May 18, 1954 |